United States Patent [19]
Porter

[11] Patent Number: 5,505,844
[45] Date of Patent: Apr. 9, 1996

[54] SWIMMING POOL BACKWASH FILTER

[76] Inventor: Mark A. Porter, PMC Machining, 21424 N. 7th Ave., #3&4&5, Phoenix, Ariz. 85027

[21] Appl. No.: 264,695

[22] Filed: Jun. 23, 1994

[51] Int. Cl.$^6$ .................................................. B01D 24/46
[52] U.S. Cl. ............................. 210/95; 210/169; 210/278
[58] Field of Search ............................ 210/95, 108, 120, 210/123, 169, 278

[56] References Cited

U.S. PATENT DOCUMENTS

| | | | |
|---|---|---|---|
| 3,365,064 | 1/1968 | Horan, Jr. | 210/169 |
| 3,420,376 | 1/1969 | Smith | 210/95 |
| 3,491,884 | 1/1970 | Baker | 210/169 |
| 3,581,895 | 6/1971 | Howard | 210/108 |
| 4,545,905 | 10/1985 | Poe | 210/136 |

Primary Examiner—Ivars Cintins
Attorney, Agent, or Firm—Richard L. Miller

[57] ABSTRACT

A swimming pool backwash filter which separates backwash contaminates from the backwash water so that the may be discarded separately, for connecting to a standard pool filtration system, having a pump with a pump inlet and a pump outlet, a sand filter having a sand filter inlet and a sand filter outlet, and having a pool return and a pool skimmer connected to the pump inlet, comprising: a backwash valve and a backwash filtering system. The backwash filtering system having an inlet and an outlet and a filter element disposed between the inlet and outlet, the outlet connected to the pump inlet. The backwash valve having a normal position and a backwash position. When in the normal position, the backwash valve connects the pump outlet and sand filter inlet, and connects the sand filter outlet and pool return. When in the backwash position, the backwash valve connects the pump outlet and sand filter outlet, and connects the sand filter inlet and backwash filtering system inlet.

4 Claims, 2 Drawing Sheets

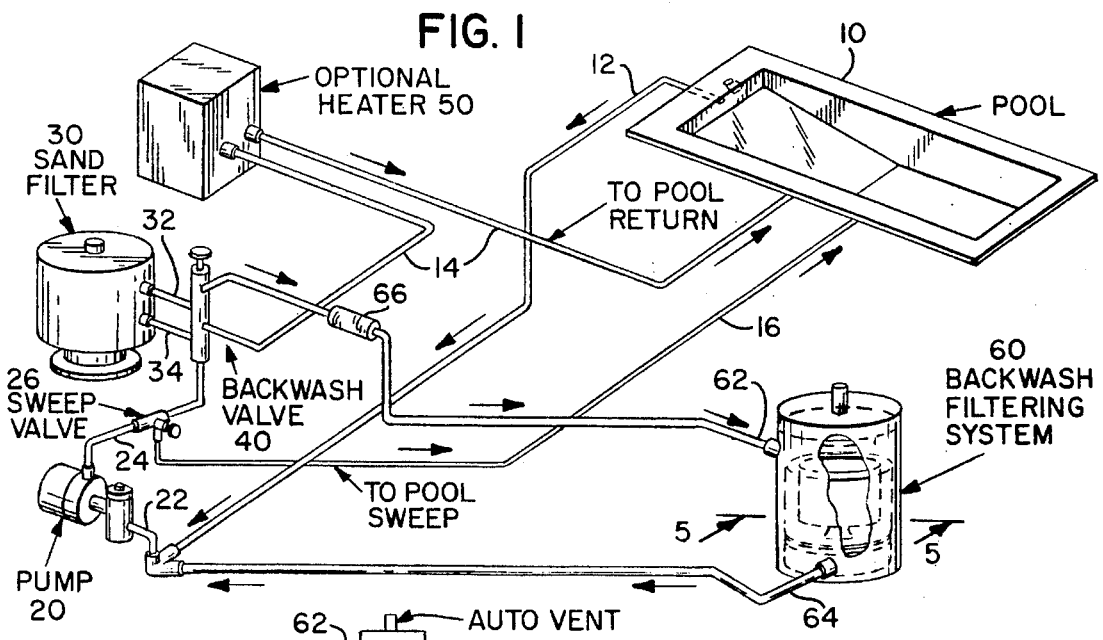
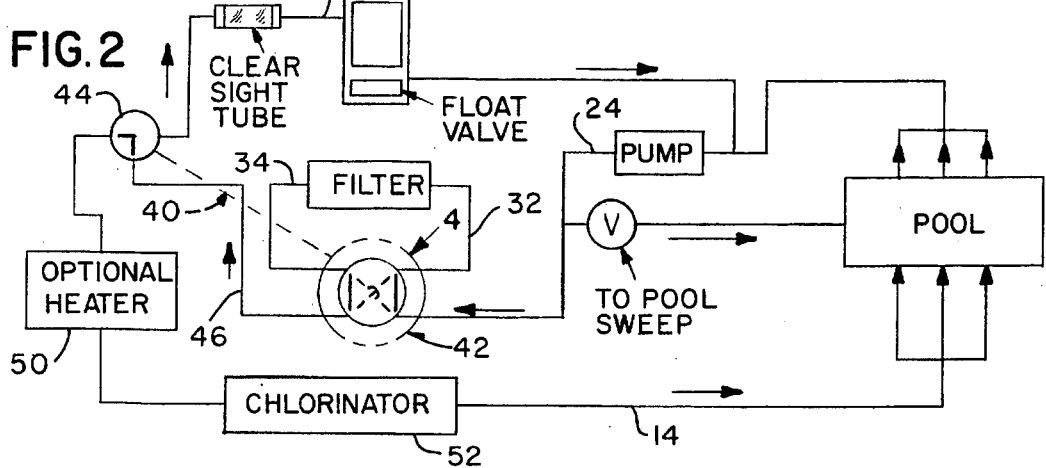
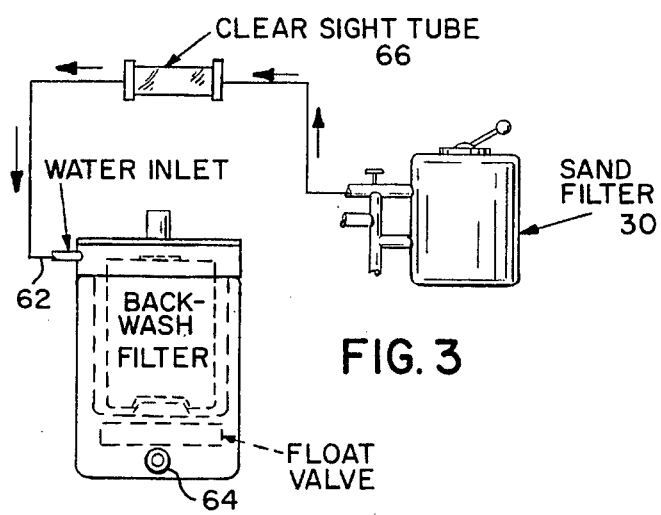
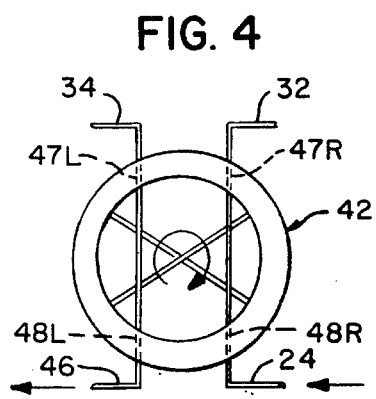

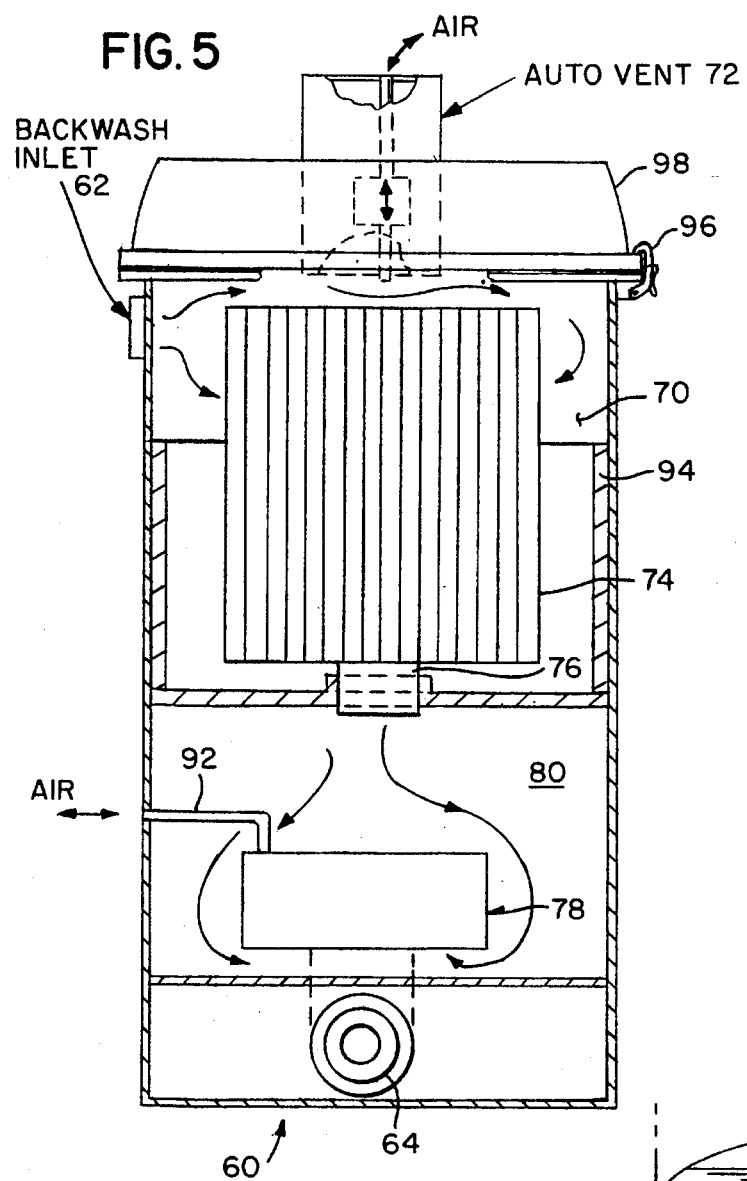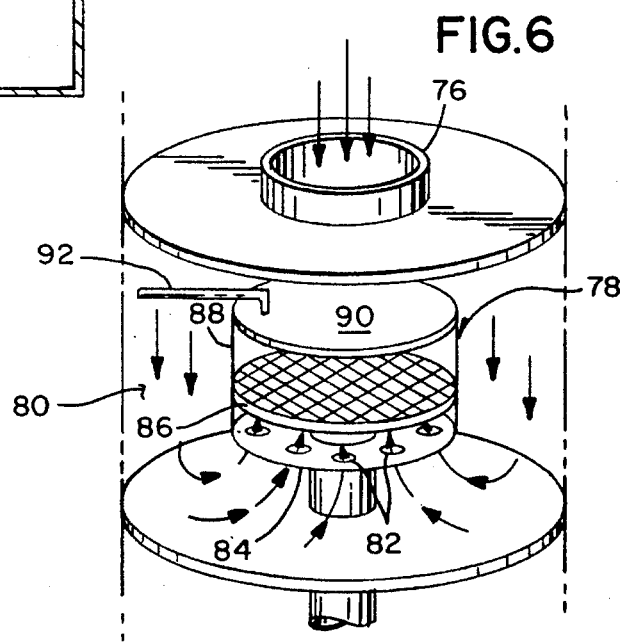

SWIMMING POOL BACKWASH FILTER

BACKGROUND OF THE INVENTION

The instant invention is the subject matter of Disclosure Document No.: 341,535, filed in the PTO on Oct. 25, 1993, and it is respectfully requested that this document be retained beyond the two-year period so that it may be relied upon as evidence of conception of the invention during the prosecution phase of this application, should the need arise.

The invention relates to a swimming pool backwash filter. More particularly, it relates to a device for automatically recycling water backwashed through a conventional pool filtration system, while not inhibiting the normal functioning of the conventional filtration system.

In a conventional pool filtration system, a sand filter is used to remove contaminants from pool water. The sand filter tends to become fouled with contaminants from continued operation. Normally, these contaminants are removed by a "backwash" operation.

During the backwash operation, water is pumped through the sand filter in the reverse direction. This backwash water, containing numerous contaminating substances, is typically discarded onto the ground. This practice has several effects that are detrimental to the environment. First, large quantities of water is wasted every time the backwash operation is performed. Second, harmful inorganic chemicals are introduced into the soil. Third, the backwash water has a detrimental effect on vegetation. Fourth, the backwash water tends to erode landscaping structures, leading to a poor appearance of the area surrounding the pool filtration system.

Several have proposed solutions to the backwash problem by developing complex apparatus for recycling backwash water.

U.S. Pat. No. 3,365,064 to Horan, discloses a swimming pool system and backwash assembly.

U.S. Pat. No. 3,491,884 to Baker, discloses a filter and valve assembly for water circulation systems.

U.S. Pat. No. 3,581,895 to Howard et al., discloses an automatic backwashing filter system.

U.S. Pat. No. 4,545,905 to Poe, discloses a filter backwash water saver and water filter.

While these units may be suitable for the particular purpose employed, or for general use, they would not be as suitable for the purposes of the present invention as disclosed hereafter.

SUMMARY OF THE INVENTION

It is an object of the invention to provide a backwash filter that recycles water during a backwash operation, but does not interfere with the normal functioning of a conventional pool filtration system.

It is another object to provide streamlined apparatus that eliminates many components present in proposed solutions in the prior art, but still provides simplified automatic operation.

It is yet another object of the instant invention to permit contaminates to be separated from the backwash water so that the contaminates can be discarded separately while the backwash water is returned cleansed to the pool without any water being wasted.

It is a further object to provide apparatus that is easily connected to a conventional pool filtration system.

It is a still further object to provide apparatus that is inexpensive to manufacture and maintain.

The invention is a swimming pool backwash filter, for connecting to a standard pool filtration system, having a pump with a pump inlet and a pump outlet, a sand filter having a sand filter inlet and a sand filter outlet, and having a pool return and a pool skimmer connected to the pump inlet, comprising: a backwash valve and a backwash filtering system. The backwash filtering system having an inlet and an outlet and a filter element disposed between the inlet and outlet, the outlet connected to the pump inlet. The backwash valve having a normal position and a backwash position. When in the normal position, the backwash valve connects the pump outlet and sand filter inlet, and connects the sand filter outlet and pool return. When in the backwash position, the backwash valve connects the pump outlet and sand filter outlet, and connects the sand filter inlet and backwash filtering system inlet.

To the accomplishment of the above and related objects, the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like reference numerals depict like elements throughout the several views. The drawings are briefly described below.

FIG 1 is a pictorial block diagrammatic illustrating the instant invention installed in a typical swimming pool system.

FIG. 2 is a block diagram also illustrating the instant invention installed in a typical swimming pool system.

FIG. 3 is a pictorial diagrammatic illustrating some of the components thereof in greater detail.

FIG. 4 is an enlarged view taken on arrow 4 in FIG. 2, illustrating the backwash valve in greater detail.

FIG. 5 is a diagrammatic cross sectional view of the backwash filter per se.

FIG. 6 is a diagrammatic cross sectional view of the float valve assembly.

DETAILED DESCRIPTION OF THE PREFERRED EMBODIMENTS

FIG. 1 illustrates a typical swimming pool system. A pool 10 has pool skimmer 12, pool return 14, and pool sweep 16 connection lines.

A pump 20 has a pump inlet 22 and a pump outlet 24. The pool skimmer 12 is connected to the pump inlet 22. The pool sweep 16 is connected to the pump outlet 24 through a sweep valve 26.

A sand filter 30 has a sand filter inlet 32 and a sand filter outlet 34. It is important to note that the sand filter herein refers to the conventional filter used in a typical swimming pool system. The conventional filter need not be of the sand filter type. However, this conventional filter is referred to herein as a sand filter merely for the purpose of consistency of terminology throughout the specification and claims. However, the use of this term in no way limits the scope of the invention.

During normal pool operation, the pump outlet 24 is connected to the sand filter inlet 32 through a backwash valve 40. Also during normal pool operation, the pool return 14 is connected to the sand filter outlet 34 through the backwash valve 42. The pool return 14 can contain an optional heater 50.

A backwash filtering system 60 has a backwash filtering system inlet 62 and a backwash filtering system outlet 64. The backwash filtering system outlet 64 is connected to the pump inlet 22.

The backwash valve 40 is operable between a normal position and a backwash position. When in the normal position, the backwash valve 40 maintains connections between the pump outlet 24 and sand filter inlet 32, and between the sand filter outlet 34 and pool return 14.

When the backwash valve 40 is in the backwash position, it connects the pump outlet 24 with the sand filter outlet 34, forcing water through the sand filter 30 in a reverse direction. Also, when in the backwash position, the backwash valve 40 connects the sand filter inlet 32 with the backwash filtering system inlet 62. Thus, the water traveling through the sand filter 30 in the reverse direction exits the sand filter inlet 32 and enters the backwash filtering system 60 through the backwash filtering system inlet 62 for recycling. Once recycled, the water exits through the backwash filtering system outlet 64 and is reintroduced to the pump inlet 22.

The backwash filtering system inlet 62 is connected to the backwash valve 40 through a clear sight tube 66. The clear sight tube 66 allows visualization of the water entering the backwash filtering system 60.

The clear sight tube 66 plays an important role in simplifying the apparatus. While most have proposed solutions that employ complex detection and timing mechanisms for determining when the backwash operation is complete, the present invention employs only one component: the clear sight tube 66. The clear sight tube 66 allows the user to visualize when water travelling therethrough is sufficiently clean so as to terminate the backwash operation manually. Allowing an informed manual choice as to when to terminate the backwash operation effectively eliminates considerable apparatus that is costly to manufacture, maintain and install.

FIG. 2 is a block diagram, illustrating the instant invention. The backwash valve 40 comprises two ganged valves: a crossover valve 42, and a selector valve 44. The backwash valve 40 has an valve internal conduit 46, which connects the crossover valve 42 and selector valve 44.

The selector valve 44 connects the internal conduit to the pool return 14 when the backwash valve 40 is in the normal position. The selector valve 44 connects the valve internal conduit 46 with the backwash filtering system inlet 62 when the backwash valve 40 is in the backwash position.

When the backwash valve 40 is in the normal position, the crossover valve 42 connects the sand filter inlet 32 with the pump outlet 24, and connects the sand filter outlet 34 with the valve internal conduit 46.

However, when the backwash valve 40 is in the backwash position, the crossover valve 42 connects the sand filter inlet 32 with the valve internal conduit 46, and connects the sand filter outlet 34 with the pump outlet 24.

As illustrated in FIG. 2, the pool return can include the optional heater 50 and a chlorinator 52.

FIG. 3 illustrates the usefulness of the clear sight tube 66. The clear sight tube 66 is disposed in the backwash filtering system inlet 62. Therefore, it provides a good indication of whether water from the sand filter 30 is still sufficiently fouled so as to require continuation of the backwash operation.

FIG. 4 illustrates the crossover valve 42. The crossover valve 42 has an upper left connection 47L, an upper right connection 47R, a lower left connection 48L, and a lower right connection 48R.

The connection scheme for the crossover valve 42 is as follows: the upper left 47L is connected to the sand filter outlet 34; the upper right 47R is connected to the sand filter inlet 32; the lower left 48L is connected to the valve internal conduit 46; and the lower right 48R is connected to the pump outlet 24.

When the backwash valve 40 is in the normal position, the upper left 47L and lower left 48L are connected, as are the upper right 47R and lower right 48R. However, when the backwash valve 40 is placed in the backwash position, the flow direction is reversed, because the upper left 47L and lower right 48R are connected, as are the upper right 47R and lower left 48L.

FIG. 5 details the backwash filtering system 60. The backwash filtering system 60 has an upper chamber 70, and a lower chamber 80.

Water enters the upper chamber 70 of the backwash filtering system 60 through the backwash filtering system inlet 62. An auto-vent 72 allows air to bleed out of the upper chamber 70 while water is entering, and bleed into the upper chamber 70 when it is emptying. This feature allows the filter to empty when not in use, so as to avoid stagnation. A suitable vent is part #239, manufactured by SIOUX CHIEF MANUFACTURING of Peculiar, Mo.

Water from the upper chamber 70 is filtered by a filter element 74, and then enters the lower chamber 80 through a central conduit 76. The water exits the lower chamber 80 through the backwash filtering system outlet 64 through a float valve 78. The float valve 78 seals the backwash filtering system outlet 64 as the water empties from the lower chamber 80. The filter element 74 can be removed from the housing 94 of the backwash filtering system 60 and accordingly may be clean occasional by rinsing of with a hose and/or replaced if required. In order that the filter element may be readily removed there is provided a securement mechanism 96 typically clamps as illustrated or in the alternative screws not shown which maintain the cover 98 in intimate contact with the housing 94.

FIG. 6 illustrates the lower chamber 80, and provides cutaway detail of the float valve 78.

At the commencement of the backwash operation, water begins to enter the lower chamber 80 through the central conduit 76. As the water fills the lower chamber, upward water pressure through flange plate holes 82 in a flange plate 84 causes a float disk 86 to move upward within a float guide 88, bringing the backwash filtering system outlet 64 into communication with the lower chamber 80. Water is flows from the lower chamber 80 and out the backwash filtering system outlet 64.

As the backwash operation is terminated, water remaining in the lower chamber 80 is sucked out the backwash filtering system outlet 64. As the water is sucked out, the float disk 86 will descend, until it is in contact with the flange plate 84, sealing the backwash filtering system outlet 64. With a lack of flow in the backwash filtering system outlet 64, the pump 20 will be supplied with water exclusively by the pool skimmer 12.

The float disk 86 in its preferred embodiment has rubber gasket material on its upper and lower surfaces. Furthermore, the float guide 88 should have an upper plate 90 bearing a float valve vent 92. The float valve vent allows air which would otherwise be trapped to bleed in and out of the space between the upper plate 90 and float disk 86 when the lower chamber 80 is filling or emptying. However, when the water level rises such that the float disk 86 is brought into contact with the upper plate 90, the valve vent 92 is sealed by the float disk 86, preventing further air flow and preventing the lower chamber from filling further.

What is claimed is:

1. A swimming pool filtration system comprising:

a) a pump with a pump inlet and a pump outlet, a sand filter with a sand filter inlet and a sand filter outlet, a pool skimmer connected to the pump inlet and a pool return;

b) a backwash filtering system, having a backwash filtering system inlet and a backwash filtering system outlet connected to the pump inlet, and a filter element disposed between the backwash filtering system inlet and backwash filtering system outlet, the backwash filtering system inlet further comprising a clear sight tube, the backwash filtering system further comprising an upper chamber and a lower chamber, the upper chamber connected to the backwash filtering system inlet, the upper chamber having an auto vent for allowing air to exit while the upper chamber fills with water and allowing air to enter while the upper chamber empties water, the filter element located in the upper chamber, and having a central conduit through which filtered water enters the lower chamber from the upper chamber, the backwash filtering system outlet is connected to the lower chamber; and c) a backwash valve connected to the pump outlet, the backwash filtering system inlet, the sand filter inlet, the sand filter outlet, and the pool return, the backwash valve further comprising a crossover valve, a selector valve, and a valve internal conduit, the crossover valve and selector valve connected by the valve internal conduit, the backwash valve having a normal position and a backwash position:

i) when in the normal position, the backwash valve connects the pump outlet with the sand filter inlet, and connects the sand filter outlet with the pool return; and ii) when in the backwash position, the backwash valve connects the pump outlet with the sand filter outlet, and connects the sand filter inlet with the backwash filtering system inlet.

2. The apparatus as recited in claim 1, wherein the lower chamber further comprises a float valve, for sealing the backwash filtering system outlet as the water empties from the lower chamber.

3. The apparatus as recited in claim 2, wherein the float valve further comprises a float guide, and a float disk in the float guide, the float valve further containing a flange plate having flange holes, the flange plate attached to the float guide.

4. The apparatus as recited in claim 3, wherein the float valve further comprises an upper plate having a vent, and the float disk having upper and lower surfaces containing rubber gasket material.

\* \* \* \* \*